United States Patent
Defoort et al.

(10) Patent No.: US 8,282,764 B2
(45) Date of Patent: *Oct. 9, 2012

(54) METHOD FOR IMPROVING MECHANICAL STRENGTH OF BONDINGS MADE WITH AN ADHESIVE BASED ON CURABLE RESIN BY CHAIN POLYMERIZATION

(75) Inventors: Brigitte Defoort, Saint Medard en Jalles (FR); Philippe Ponsaud, Paris (FR); Xavier Cocqueret, Reims (FR)

(73) Assignees: Astrium SAS, Paris (FR); Universite des Sciences et Technologies de Lille, Villeneuve d'Ascq (FR)

( * ) Notice: Subject to any disclaimer, the term of this patent is extended or adjusted under 35 U.S.C. 154(b) by 164 days.

This patent is subject to a terminal disclaimer.

(21) Appl. No.: 12/299,044

(22) PCT Filed: May 10, 2007

(86) PCT No.: PCT/EP2007/054523
§ 371 (c)(1),
(2), (4) Date: Oct. 30, 2008

(87) PCT Pub. No.: WO2007/131935
PCT Pub. Date: Nov. 22, 2007

(65) Prior Publication Data
US 2009/0133823 A1    May 28, 2009

(30) Foreign Application Priority Data

May 11, 2006 (FR) ...................................... 06 51700

(51) Int. Cl.
*B32B 37/12* (2006.01)

(52) U.S. Cl. .................. 156/327; 156/275.5; 156/275.7; 156/330; 427/302

(58) Field of Classification Search ............... 156/275.5, 156/275.7, 99–106, 331.1, 327, 330; 427/301, 427/302
See application file for complete search history.

(56) References Cited

U.S. PATENT DOCUMENTS 4,717,605 A * 1/1988 Urban et al. ................. 428/1.53
(Continued)

FOREIGN PATENT DOCUMENTS

FR    2 879 208    6/2006
(Continued)

OTHER PUBLICATIONS

G. Odian, "La polymerisation, principes et applications $3^{rd}$ edition", Ed. Polytechnica, 1994 (with p. 247 of the English version of this book).

*Primary Examiner* — Katarzyna Wyrozebski Lee
*Assistant Examiner* — Scott W Dodds
(74) *Attorney, Agent, or Firm* — Oblon, Spivak, McClelland, Maier & Neustadt, L.L.P.

(57) ABSTRACT

The invention relates to a process that makes it possible to improve the mechanical strength of bonds between substrates when these bonds are produced by means of an adhesive that comprises a resin that can be cured by chain polymerization, and in particular a resin that can be cured under the effect of ionizing or light radiation.

This process is characterized in that it comprises the grafting of groups capable of acting as chain transfer agents during the polymerization of said resin to the surface of the substrates, before the latter are brought into contact with the adhesive.

Applications: assembling of structural, engine, passenger compartment or bodywork parts in the aeronautical, space, railway, ship-building and automotive industries.

14 Claims, 2 Drawing Sheets

U.S. PATENT DOCUMENTS

| | | | | |
|---|---|---|---|---|
| 5,045,397 | A * | 9/1991 | Jensen | 428/429 |
| 6,001,203 | A * | 12/1999 | Yamada et al. | 156/106 |
| 6,037,008 | A | 3/2000 | Huang et al. | |
| 6,492,028 | B2 * | 12/2002 | Kotera et al. | 428/424.8 |
| 6,540,866 | B1 * | 4/2003 | Zhang et al. | 156/272.6 |
| 2008/0009123 | A1 | 1/2008 | Kostrzewa et al. | |
| 2008/0255332 | A1 * | 10/2008 | Defoort et al. | 526/273 |
| 2010/0092695 | A1 * | 4/2010 | Schultz et al. | 427/569 |

FOREIGN PATENT DOCUMENTS

| | | | |
|---|---|---|---|
| GB | 2344299 | * | 6/2000 |
| WO | 97/49756 | | 12/1997 |

* cited by examiner

METHOD FOR IMPROVING MECHANICAL STRENGTH OF BONDINGS MADE WITH AN ADHESIVE BASED ON CURABLE RESIN BY CHAIN POLYMERIZATION

TECHNICAL FIELD

The present invention relates to a process that makes it possible to improve the mechanical strength of bonds between substrates when these bonds are produced by means of an adhesive which comprises a resin that can be cured by chain polymerization, and in particular a resin that can be cured under the effect of ionizing or light radiation.

This process, which makes it possible to obtain assemblies of parts having remarkable properties in terms of resistance to stresses, both transverse and longitudinal, is of most particular advantage in the aeronautical, space, railway, ship-building and automotive industries, whether for assembling structural, engine, passenger compartment or bodywork parts.

PRIOR ART

In industry, the assembling of parts by bonding has developed in recent years to the detriment of conventional methods of assembling by mechanical means, for example of the screw, nut-and-bolt or rivet type.

This development has especially been made possible by the arrival on the market of novel adhesives having a considerably reduced curing time and that are therefore compatible with the manufacturing constraints of the fields in question such as, for example, use on production lines.

A certain number of these adhesives have, as the main constituent, a resin that cures by chain polymerization. Except in the case where it is induced by an electron beam, this type of polymerization requires the presence, in the resin, of an initiator that makes it possible to create, starting from a few monomer molecules, active centres, the activity of which will then spread to other monomer molecules, thus causing a chain-polymerization reaction. The active centres may be radicals or ions. Therefore, two types of chain polymerization are distinguished: radical and ionic.

During a chain polymerization, transfer reactions in particular take place. Unlike termination reactions which, by irreversible destruction of the active centres, stop the growth of macromolecular chains, the transfer reactions enable new chains to be restarted. This phenomenon may be exploited in order to control the average molecular weight of the polymers that are formed so as to obtain three-dimensional networks with improved properties.

This control is usually achieved by the use of chain transfer agents whose role is to cause the termination of the growth of the chains and simultaneously to restart new chains.

Examples of chain transfer agents are given by G. Odian in "*La polymérisation, principes et applications*" ["Polymerization, principles and applications"], 3rd edition, published by Polytechnica, 1994, page 277.

Furthermore, the polymerization of the resin and, therefore, its curing may be induced either by heat, or by a redox reaction, or else by light radiation (visible or ultraviolet light) or ionizing radiation (β, γ or X-ray radiation).

The use of adhesives that can be cured under the effect of ionizing or light radiation has a certain number of advantages relative to that of adhesives that can be cured by heat, these advantages especially being linked to the possibility, on the one hand, of working without an autoclave, which is particularly appreciated in the case of bonding parts of large dimensions and, on the other hand, of obtaining higher polymerization rates, which allows higher production outputs for lower costs.

Conversely, experience shows that the mechanical strength of bonds produced with adhesives for which the curing has been obtained by application of light or ionizing radiation is very substantially below that of bonds produced by means of adhesives for which the curing has been obtained by thermal means. Their fracture appearance is, furthermore, unfavourable since it is an adhesive and not cohesive rupture.

The inventors have therefore set themselves the objective of providing a process that makes it possible to improve the mechanical strength of bonds between substrates when these bonds are produced with an adhesive comprising a radiation-curable resin and more specifically, a resin that can be cured by chain polymerization since, in practice, the adhesives capable of curing under the effect of radiation are based on resins whose polymerization is carried out by a chain mechanism.

They have furthermore set themselves the objective that this process be, in particular, applicable to the bonding of substrates made of an epoxy resin or of a composite material having an epoxide matrix (carbon/epoxide, Kevlar/epoxide, graphite/epoxide, etc.) that correspond to the types of substrates most frequently used in the aeronautical and space industries.

They have additionally set themselves the objective that the conditions and costs for carrying out this process be compatible with its exploitation on an industrial scale.

SUMMARY OF THE INVENTION

These objectives, and others too, are achieved by the present invention which provides a process for improving the mechanical strength of a bond between substrates when this bond is produced by means of an adhesive comprising a resin that can be cured by chain polymerization, which process is characterized in that it comprises the grafting of groups capable of acting as chain transfer agents during the polymerization of said resin, to the surface of the substrates before the latter are brought into contact with the adhesive.

In the preceding and subsequent text, the term "polymerization" should be understood as including not only the formation of polymer chains by bonding monomers or prepolymers together, but also the formation of a three-dimensional network by establishing bonds between these polymer chains, which is commonly referred to as crosslinking.

Thus, according to the invention, the strength of the bond between substrates is improved by increasing the adhesion of these substrates with respect to the adhesive by grafting, to the surface of the substrates, before they are brought into contact with the adhesive (that is to say, in practice, before the adhesive has been deposited on the surface or the part of the surface where the bonding is to be carried out), of organic groups capable of acting as chain transfer agents during the polymerization of the curable resin present in the adhesive.

Currently in their work, the Inventors believe that the increase in the substrates/adhesive adhesion could be linked to the fact that the groups grafted to the surface of these substrates could be converted, during the polymerization of the resin, to active centres (that is to say to radicals or ions depending on whether the chain polymerization is of radical type or of ionic type) by reaction with growing polymer chains, and that these active centres could be capable of initiating the formation of new polymer chains starting from the surface of the substrates, which could then be bonded covalently to this surface as soon as they are created.

This assumed mechanism can be illustrated schematically in the following manner:

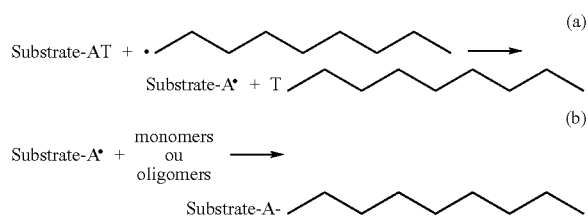

where:

AT represents a group that can act as a chain transfer agent, which is chemically bonded to the surface of the substrate,

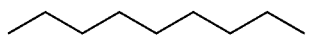

represents a polymer chain, step (a) illustrates the conversion of this group to an active centre; and step (b) illustrates the formation of a new polymer chain starting from the surface of the substrate.

In accordance with the invention, the groups that are grafted to the surface of the substrates may be chosen from the many groups known for being capable of acting as chain transfer agents in a chain polymerization, it being understood that use will preferably be made of those that enable a substrates/adhesive adhesion that is the most satisfactory possible to be obtained. In order to do this, it is entirely possible to evaluate the effect of groups of various types on the adhesion of substrates, with respect to one particular adhesive, for example, by subjecting assemblies obtained by bonding together, with this adhesive, two representative samples of these substrates, on the surface of which groups of one of these types will have previously been grafted, to a tensile test and by comparing the results obtained for each type of grafted groups. An example of a tensile test that can be used for this purpose is described in Example 1 below.

As groups capable of acting as chain transfer agents in a chain polymerization, mention may especially be made of carbon-based groups comprising an —I, —Br, —Cl, —F, —SH, —OH, —NH—, —NH$_2$, —PH—, —PH$_2$ or =S function and also the carbon-based groups lacking a heteroatom but that can give rise to a radical transfer such as, for example, optionally substituted allyl or benzyl —CH groups.

However, it has emerged that, within the context of their work, the Inventors have observed that the grafting of carbon-based groups comprising a thiol function makes it possible to obtain a particularly significant improvement of the adhesion to substrates with respect to adhesives comprising a resin that can be cured by chain polymerization, and especially when the substrates are made of an epoxide resin or of a composite material having an epoxide matrix whilst the adhesive is based on a resin of multiacrylate type such as an epoxy acrylate resin.

Thus, the carbon-based groups having a thiol function are those that it is preferred to graft in the process according to the invention.

In accordance with the invention, the grafting of groups capable of acting as chain transfer agents to the surface of the substrates may be carried out by reacting the functional groups present on this surface or some of these groups (they are not all identical to one another) with an organic compound which, either comprises a group capable of acting as a chain transfer agent, or generates, during the reaction, such a group.

The choice of this organic compound is influenced by the type or types of functional groups present at the surface of the substrates, this or these groups possibly being groups that the substrates naturally bear throughout the material that constitutes them, or groups that are deliberately created by subjecting the substrates to an appropriate treatment.

Thus, for example, substrates made of an epoxide resin or of a composite material having an epoxide matrix naturally have epoxide groups available at their surface, whereas it will be necessary, in the case of substrates made of carbon, to create, at the surface of these substrates, oxygen-based groups such as hydroxyl, ketone, carboxyl or ether groups, for example by a chemical or electrolytic oxidation.

In a first preferred embodiment of the process according to the invention, the grafting of the groups capable of acting as chain transfer agents to the surface of the substrates is carried out by reacting functional groups present at the surface of these substrates with an organic compound that contains both a chemical function capable of reacting with said functional groups, and a group capable of acting as a chain transfer agent.

Thus, for example, in the case where it is desired to graft carbon-based groups having a thiol function to the surface of substrates comprising epoxide groups, this grafting is carried out by using an organic compound that comprises, on the one hand, a chemical function capable of reacting with the epoxide groups, and, on the other hand, a carbon-based group comprising a thiol function.

The chemical function capable of reacting with the epoxide groups is, preferably, a carboxyl or phenol function and the reaction is advantageously carried out at high temperature (for example, at a temperature of 150° C.), under vacuum and in the presence of a catalyst, preferably a tertiary amine, such as 2-dimethylaminoethyl methacrylate.

An organic compound having both a carboxyl function and a group having a thiol function is, for example, thiomalic acid, thioglycolic acid, thiolactic acid, 3-mercaptopropionic acid, 11-mercaptoundecanoic acid, 16-mercaptohexadecanoic acid, 2-mercaptonicotinic acid, 6-mercaptonicotinic acid and 2-mercapto-4-methyl-5-thiazoleacetic acid, whereas a compound having both a phenol function and a group having a thiol function is, for example, 2-mercaptophenol, 3-mercaptophenol, 4-mercaptophenol or 4-thiouracil.

In another preferred embodiment of the process according to the invention, the grafting of the groups capable of acting as chain transfer agents to the surface of the substrates is carried out by reacting functional groups present at the surface of these substrates with a cyclic organic compound, which, by ring opening, covalently bonds to the functional groups of the substrates and simultaneously generates a group capable of acting as a chain transfer agent.

Thus, for example, in the case where it is desired to graft carbon-based groups having a thiol function to the surface of substrates which comprise carboxyl groups in particular, this grafting is carried out by reacting the latter with an episulphide which, by ring opening, is bonded covalently to a carboxyl function and simultaneously generates a group having a thiol function.

The episulphide is for example, propylene sulphide, ethylene sulphide, cyclohexene sulphide, epithiodecane, epithiododecane and 7-thiabicyclo[4.1.0]heptane, and the reaction is advantageously carried out at high temperature (for example, at a temperature of around 100° C.), in the presence of a catalyst, preferably a tertiary amine such as triethylamine.

In any case, it falls within the normal abilities of a person skilled in the art of coupling chemical functions to know how to determine, depending on the functional groups present at the surface of the substrates that he intends to bond, which are the compounds suitable for enabling him to graft the groups of his choice to the surface of these substrates, and to set the conditions in which the grafting must be carried out in order to be effective, especially as regards the proportions of reactive(s) and of catalyst(s) that should be used, and also the temperature and pressure parameters necessary for this grafting to proceed correctly.

Another subject of the invention is a process for bonding substrates by means of an adhesive comprising a resin that can be cured by chain polymerization, which is characterized in that it comprises the implementation of a process for improving the mechanical strength of a bond as defined above.

In this respect, it should be noted that it is not necessary to carry out the bonding of the substrates immediately after having grafted to their surface the groups capable of acting as chain transfer agents and that the substrates, once grafted, can perfectly well be kept for several days or several weeks before being bonded.

In accordance with the invention, the curable resin present in the adhesive may be chosen from all resins that are capable of curing by a chain-polymerization mechanism, whether this is under the effect of heat, or under the effect of an ionizing or light radiation. This is because the Inventors have observed that the process according to the invention is effective both in the case of a thermosetting resin and a photo-curable or radiation-curable resin.

However, for the reasons explained previously, the resin is preferably chosen from resins that can be polymerized under the effect of ionizing or light radiation, and in particular from multiacrylate-type resins such as epoxy acrylate resins, novolac acrylates and polyurethane acrylates, bis-maleimide resins and epoxide resins.

In one particularly preferred embodiment of the process according to the invention, the substrates are made of an epoxide resin or of a composite material having an epoxide matrix, whereas the curable resin present in the adhesive is an epoxy acrylate resin.

Other features and advantages of the process according to the invention will appear more clearly on reading the remainder of the following description, which relates to an exemplary embodiment of this process and which refers to the appended figures.

Of course, this example is given only by way of illustration of subject of the invention and does not in any case constitute a limitation of this subject.

DETAILED SUMMARY OF A PREFERRED EMBODIMENT OF THE INVENTION

This example relates to the grafting of groups having a thiol function to the surface of substrates made of epoxide resin and to the effect of this grafting on the mechanical strength of bonds produced between these substrates by means of a radiation-curable epoxy acrylate resin.

Figure 1:
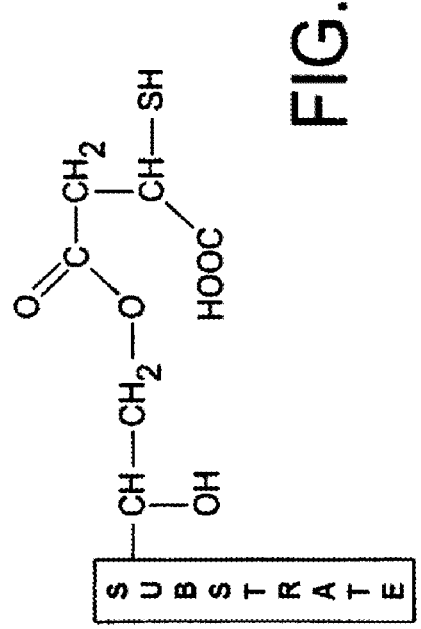
FIG. 1 schematically illustrates a first example of a reaction that makes it possible to graft groups having a thiol function to the surface of a substrate, in which an epoxide function situated at the surface of the substrate is reacted with a thiomalic acid in the presence of a tertiary amine.

The grafting of groups having a thiol function is carried out by reacting the epoxide functions available at the surface of the substrates with thiomalic acid in the presence of a tertiary amine, according to the reaction scheme illustrated in FIG. 1.

The experimental conditions are the following.

2 mm thick sheets of epoxide resin are made by inducing the cationic polymerization of a bisphenol A diglycidyl ether epoxide resin (DER330 resin from Dow Chemical Company with iodonium salt) by applying a radiation of 10 kGy. The sheets thus obtained have an estimated conversion between 0.5 and 0.6 and a glass transition temperature of around 60° C. They therefore have quite a large amount of epoxide functions available on their surface.

Square samples having sides of 50 mm were cut from these sheets, one side of which was sanded with a fine sandpaper (600 grain).

The sanded side of some of these samples was brushed with a solution of 10 wt % thiomalic acid and 0.5 wt % 2-dimethylaminoethyl methacrylate in methyl ethyl ketone, then the samples thus coated were subjected to a heat treatment at 150° C. for 30 min, under vacuum, after a temperature increase of 45 min.

Sandwiches formed from two samples bonded to one another by a thin layer of epoxy acrylate resin (EB600 from UCB Chemicals), were produced by applying two samples to one another after having placed between them a few drops of the resin preheated to 90° C., then by placing the whole assembly in a vacuum chamber (1 bar) in order to enable the resin to creep into a thin layer between the two samples, and finally by inducing the polymerization of the resin by applying four irradiations of 25 kGy each, at ambient temperature and under vacuum (1 bar).

For comparative purposes, sandwiches were also produced by following the same procedure but by using epoxide resin samples that had not undergone grafting.

Figure 2:
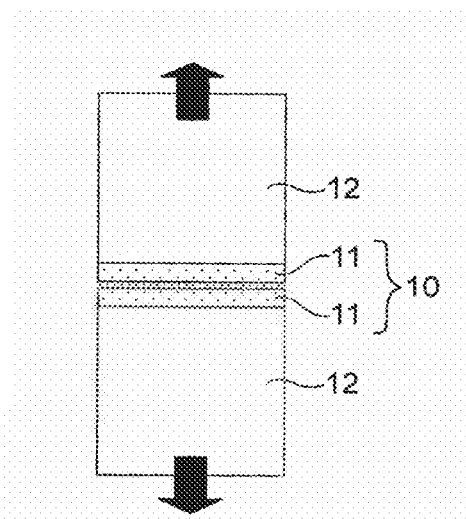
FIG. 2 schematically represents the principle of the tensile test used within the context of the invention for assessing the mechanical strength of a bond between two substrates.

In order to evaluate the mechanical strength of the bonds thus produced, each of the samples 11 of one and the same sandwich 10 responded, as seen in FIG. 2, to a tensile block 12 with an adhesive based on an amine epoxide resin (EA 9321 from Structil) which polymerizes in 24 hours, at ambient temperature and under vacuum (1 bar). Then, the blocks are subjected to a tensile stress, which is symbolized by the two black arrows in FIG. 2, on an Instron 5500R, supported by BlueHill software. The loading rate was 1 mm/min. The load and the tensile strength were thus evaluated.

The results showed that, in the case where the samples of epoxide resin were previously grafted with groups having a thiol function, the tensile strength of the bonds was more than two times greater than that obtained for the bonds produced between samples that have not undergone grafting (9.5 MPa versus 4.5 MPa), which is expressed by a very substantial improvement in the adhesion between the samples and the epoxy acrylate resin used as adhesive.

Figure 3A:
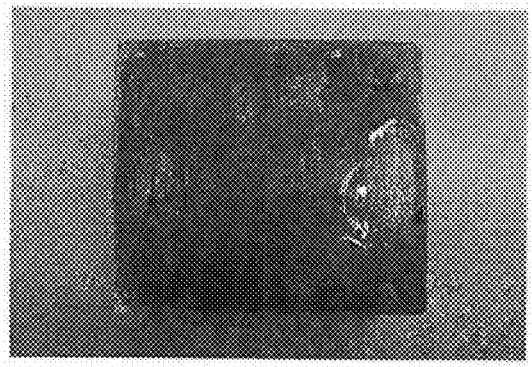
FIGS. 3A and 3B correspond to two photos that show the fracture appearances obtained by subjecting sandwiches, formed from two substrates bonded to one another via a layer of resin, to the tensile test whose principle is illustrated in FIG. 2, depending on whether these substrates have (FIG. 3B) or have not (FIG. 3A) been pretreated by the process according to the invention.
Figure 3B:
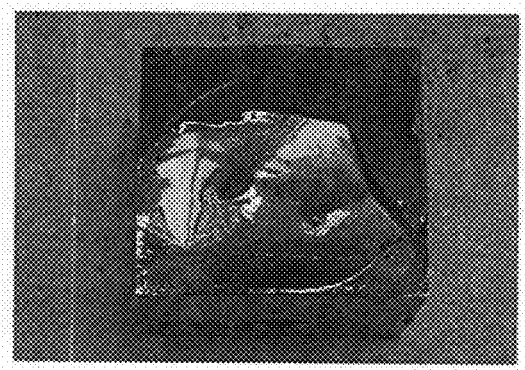

Furthermore, as shown in FIG. 3B in which fragments of torn off epoxide resin can clearly be distinguished in the negative, the fracture appearance is substantially cohesive in the case where the epoxide resin samples had previously been grafted with groups having a thiol function, which implies that the strength at the interface between these samples and the epoxy acrylate resin used as adhesive is greater than the intrinsic strength of the epoxide resin which constitutes them.

Conversely, the fracture appearance is adhesive in the case where the samples have not undergone grafting, the fracture then taking place at the interface between the epoxide resin samples and the epoxy acrylate resin used as adhesive, as demonstrated by the smooth surface that can be seen in the FIG. 3A.

The invention is not limited to the embodiment which has just expressly been described.

Figure 4:
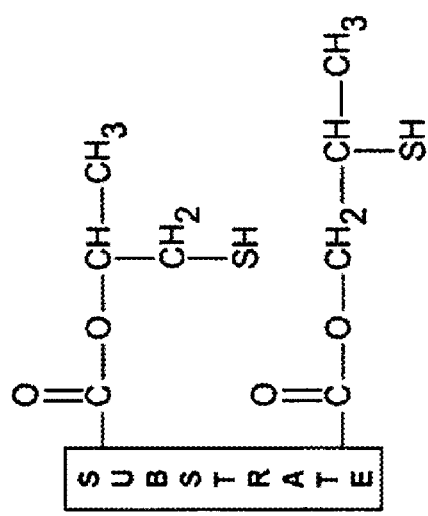
FIG. 4 schematically illustrates a second example of a reaction that makes it possible to graft groups having a thiol function to the surface of a substrate, in which a carboxyl function located at the surface of the substrate is reacted with propylene sulphide in the presence of a tertiary amine. This figure shows the chemical structure of the two types of group having a thiol function assumed to be able to be attached to the surface of the substrate during this reaction.

Thus, for example, FIG. 4 illustrates another example of a reaction suitable for allowing the grafting of groups having a thiol function to the surface of substrates comprising carboxyl groups. Such substrates are, for example, substrates made of carbon that have previously undergone a chemical or electrolytic oxidation treatment to create oxygen-based functional groups on their surface.

In this reaction, the carboxyl groups are reacted with propylene sulphide in the presence of a tertiary amine, for example triethylamine.

As shown in FIG. 4, two types of groups having a thiol function are, in this case, capable of being attached to the surface of the substrates.

The invention claimed is:

1. A process of bonding a first substrate and a second substrate with an adhesive comprising a resin that can be cured by chain transfer polymerization, wherein each of said first substrate and said second substrate has a surface where the bonding is to be carried out and wherein the surface comprises grafted chemical groups, said process comprising:
   a) depositing the adhesive on the surface where the bonding is to be carried out of at least one of the first substrate and the second substrate;
   b) bringing into contact the surfaces where the bonding is to be carried out of the first substrate and the second substrate; and
   c) inducing the chain transfer polymerization of the curable resin present in the adhesive so as to obtain the curing of said resin and thereby the bonding of the first substrate and the second substrate;
   and wherein the chemical groups which are grafted on the surface of both the first substrate and the second substrate are carbon-based groups comprising at least one function selected from the group consisting of —SH, —PH—, —PH$_2$ and =S, and wherein said chemical groups act as chain transfer agents during the chain transfer polymerization of the curable resin present in the adhesive.

2. The process according to claim 1, wherein the chemical groups which act as chain transfer agents are carbon-based groups comprising a thiol (—SH) function.

3. The process according to claim 1, wherein the grafting of the chemical groups which act as chain transfer agents to the surface of both the first substrate and the second substrate is carried out by reacting functional groups present at the surface of both the first substrate and the second substrate with an organic compound that comprises a chemical function, and a chemical group which acts as a chain transfer agent.

4. The process according to claim 3, wherein the organic compound comprises, as a chemical group, a group that comprises a thiol function.

5. The process according to claim 4, wherein the functional groups present at the surface of both the first substrate and the second substrate are epoxide groups and the organic compound has, as a chemical function, a carboxyl function or a phenol function.

6. The process according to claim 5, wherein the reaction of the epoxide groups present at the surface of both the first substrate and the second substrate with the organic compound having a carboxyl or phenol function is carried out at high temperature, under vacuum and in the presence of a tertiary amine catalyst.

7. The process according to claim 5, wherein the organic compound is at least one selected from the group consisting of thiomalic acid, thioglycolic acid, thiolactic acid, 3-mercaptopropionic acid, 11-mercaptoundecanoic acid, 16-mercaptohexadecanoic acid, 2-mercaptonicotinic acid, 6-mercaptonicotinic acid and 2-mercapto-4-methyl-5-thiazoleacetic acid.

8. The process according to claim 1, wherein the grafting of the chemical groups which act as chain transfer agents to the surface of both the first substrate and the second substrate is carried out by reacting functional groups present at the surface of both the first substrate and the second substrate with an organic compound, which, by ring opening, covalently bonds to the functional groups of the first substrate and the second substrate and simultaneously generates a chemical group which acts as a chain transfer agent.

9. The process according to claim 8, wherein the functional groups present at the surface of both the first substrate and the second substrate are carboxyl groups and the organic compound is an episulphide which generates a group comprising a thiol function.

10. The process according to claim 9, wherein the episulphide is selected from the group consisting of propylene sulphide, ethylene sulphide, cyclohexene sulphide, epithiodecane, epithiododecane and 7-thiabicyclo[4.1.0]heptane.

11. The process according to claim 9, wherein the reaction of the carboxyl groups present at the surface of both the first substrate and the second substrate with the episulphide is carried out at high temperature and in the presence of a tertiary amine catalyst.

12. The process according to claim 1, wherein the resin present in the adhesive is a resin that can be polymerized under the effect of ionizing or light radiation.

13. The process according to claim 12, wherein the resin present in the adhesive is at least one selected from the group consisting of epoxy acrylate, novolac acrylate, polyurethane acrylate, bis-maleimide and an epoxide resin.

14. The process according to claim 1, wherein the first substrate and the second substrate comprise an epoxide resin or a composite material having an epoxide matrix, whereas the curable resin present in the adhesive is an epoxy acrylate resin.

* * * * *